(12) United States Patent
Kim

(10) Patent No.: US 6,825,638 B2
(45) Date of Patent: Nov. 30, 2004

(54) BATTERY CHARGING SYSTEM AND CHARGING METHOD THEREOF

(75) Inventor: Sung-hun Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 50 days.

(21) Appl. No.: 10/404,038

(22) Filed: Apr. 2, 2003

(65) Prior Publication Data

US 2004/0051498 A1 Mar. 18, 2004

(30) Foreign Application Priority Data

Sep. 16, 2002 (KR) ........................................ 2002-56191

(51) Int. Cl.[7] ........................ H01M 10/44; H01M 10/46
(52) U.S. Cl. ..................................................... 320/119
(58) Field of Search .............................. 320/116, 119, 320/123, 126, 137

(56) References Cited

U.S. PATENT DOCUMENTS

| 5,646,504 A | * | 7/1997 | Feldstein ..................... 320/119 |
| 5,903,764 A |   | 5/1999 | Shyr et al. |
| 6,043,629 A | * | 3/2000 | Ashley et al. ............... 320/119 |
| 6,222,344 B1 | * | 4/2001 | Peterson et al. ............. 320/119 |

FOREIGN PATENT DOCUMENTS

| JP | 3-116312 | 5/1991 |
| JP | 9-215215 | 8/1997 |
| JP | 9-264852 | 10/1997 |
| JP | 10-12281 | 1/1998 |
| JP | 10-225004 | 8/1998 |
| JP | 11-134070 | 5/1999 |
| JP | 2000-132282 | 5/2000 |
| KR | 1999-86 | 1/1999 |

* cited by examiner

Primary Examiner—Edward H. Tso
(74) Attorney, Agent, or Firm—Staas & Halsey LLP

(57) ABSTRACT

A battery charging system includes two or more rechargeable batteries, a charging power supply charging the batteries with an external electrical power, a charging power sensing part sensing at least one of a voltage and a current of a charging power supplied from the charging power supply to the batteries, and a charging control part controlling the charging power supply to supply an idle power created during charging one battery, to another battery according to a sensed result of the charging power sensing part. With this configuration, a charging time of the two or more batteries is reduced, and the electrical power is efficiently used when the two or more batteries are charged.

19 Claims, 5 Drawing Sheets

BATTERY CHARGING SYSTEM AND CHARGING METHOD THEREOF

CROSS-REFERENCE TO RELATED APPLICATIONS

This application claims the benefit of Korean Patent Application No. 2002-56191, filed Sep. 16, 2002, in the Korean Intellectual Property Office, the disclosure of which is incorporated herein by reference.

BACKGROUND OF THE INVENTION

1. Field of the Invention

The present invention relates to a battery charging system and a charging method thereof, which can not only reduce the time of charging two or more batteries but also efficiently use an electrical power of a power source when two or more batteries are charged, and more particularly, to a battery charging system and a charging method of charging two or more batteries using an idle power.

2. Description of the Related Art

A portable computer, such as a notebook PC (personal computer), a PDA (personal digital assistant), a handheld PC, etc., is occasionally driven by a battery in a case where an adapter cannot be used for supplying electrical power. In this case, it is possible that two or more batteries are prepared for driving the portable computer for a long time.

Generally, the portable computer employs a rechargeable battery, such as a Li-ion battery, a polymer battery, etc. When the Li-ion or polymer battery is charged, a constant-current is continuously supplied to the battery in an early charging stage, which is called a constant-current charging mode. When the constant current is continuously supplied, an output voltage of the battery increases. Thereafter, when the output voltage of the battery reaches a predetermined voltage, an internal or external charging control part controls a voltage supplied to the battery not to increase higher than the predetermined voltage so as to prevent the battery from being overcharged. Hence, the battery is continuously charged at a constant voltage, which is called a constant-voltage charging mode.

A conventional charging method of charging the battery is as follows. FIG. 4 is a flowchart of the conventional charging method of charging two batteries, and FIG. 5 is a graph illustrating voltage and current variations when the two batteries are charged As shown in FIGS. 4 and 5, in a case where first and second batteries are both charged, it is first sensed whether the electrical power for charging the first and second batteries is supplied from an adapter in operation P10. When the electrical power for charging the batteries is supplied from the adapter, the first battery starts to be charged in operation P12. At this time, an electrical current ($i_1$) and an electrical voltage ($v_1$) supplied to the first battery are illustrated in FIG. 5. When the first battery starts to be charged, the first battery is charged with a constant current ($i_1$) (see an interval between $t_0$ and $t_1$). Herein, an interval ($t_0$~$t_1$) in which the current ($i_1$) is kept constant is called a constant-current charging mode. In the constant-current charging mode, an output voltage of the first battery is gradually increased. When the output voltage of the battery reaches a predetermined voltage, an internal or external charging control part controls the voltage ($v_1$) supplied to the first battery not to increase higher than the predetermined voltage so as to prevent the battery from being overcharged (see an interval between $t_1$ and $t_2$). Herein, an interval ($t_1$~$t_2$) in which the voltage ($v_1$) is kept constant is called a constant-voltage charging mode. In the constant-voltage charging mode, the first battery is almost charged, and the current ($i_1$) supplied to the first battery is gradually decreased.

Then, the charging control part (not shown) controlling the battery charging determines whether the first battery is charged completely in operation P14. Herein, completion of the battery charging is determined by depending on how much time is taken to charge a battery. When it is determined that the first battery is completely charged, the second battery starts to be charged in operation P16. Similarly, the second battery is charged through the constant-current charging mode ($t_2$~$t_3$) and the constant-voltage charging mode ($t_3$~$t_4$). When the second battery is completely charged, charging both of the first and second batteries is completed in operation P18.

As described above, when two or more batteries are charged according to the conventional battery charging method, one is completely charged and then the other one starts to be charged. That is, two or more batteries are charged one by one, so that it takes a relatively long time to charge the two or more batteries.

Further, in the constant-voltage charging mode ($t_1$~$t_2$ or $t_3$~$t_4$), the current ($i_1$ or $i_2$) supplied to the battery is gradually decreased, so that there is created an idle current being not supplied to the battery as much as the current ($i_1$ or $i_2$) is decreased.

SUMMARY OF THE INVENTION

Accordingly, it is an aspect of the present invention to provide a battery charging system and a charging method thereof, which can not only reduce a charging time of two or more batteries but also efficiently use an electrical power of a power source when two or more batteries are charged.

Additional aspects and advantages of the invention will be set forth in part in the description which follows and, in part, will be obvious form the description, or may be learned by practice of the invention.

The foregoing and/or other aspects of the present invention are achieved by providing a battery charging system including two or more rechargeable batteries, a charging power supply charging the batteries with an external electric power, a charging power sensing part sensing at least one of a voltage and a current of a charging power supplied from the charging power supply to one of the batteries, and a charging control part controlling the charging power supply to supply another battery with an idle power created during charging the one battery according to a sensed result of the charging power sensing part.

According to an aspect of the invention, the charging control part determines that the idle power is created when the voltage supplied to the one battery is kept constant according to the sensed result of the charging power sensing part, and then controls the charging power supply to supply the idle power to the another battery.

According to an aspect of the invention, the charging control part determines that the idle power is created when the current supplied to the one battery is gradually decreased according to the sensed result of the charging power sensing part, and then controls the charging power supply to supply the idle power to the another battery.

According to another aspect of the present invention, the foregoing and/or other aspects may be also achieved by providing a battery charging method of charging two or more rechargeable batteries using a charging power supply charging the batteries with an external electric power. The method includes charging one of the batteries when the external electric power is supplied, sensing at least one of a voltage and a current of a charging power supplied to the one battery being charged, determining whether an idle power is created during charging the one battery according to a sensed result of the charging power, and controlling the charging power supply to supply the idle power to another battery when it is determined that the idle power is created.

BRIEF DESCRIPTION OF THE DRAWINGS

These and/or other objects and advantages of the present invention will become apparent and more readily appreciated from the following description of the embodiment, taken in conjunction with the accompany drawings of which.

DETAILED DESCRIPTION OF THE PREFERRED EMBODIMENTS

Figure 1:
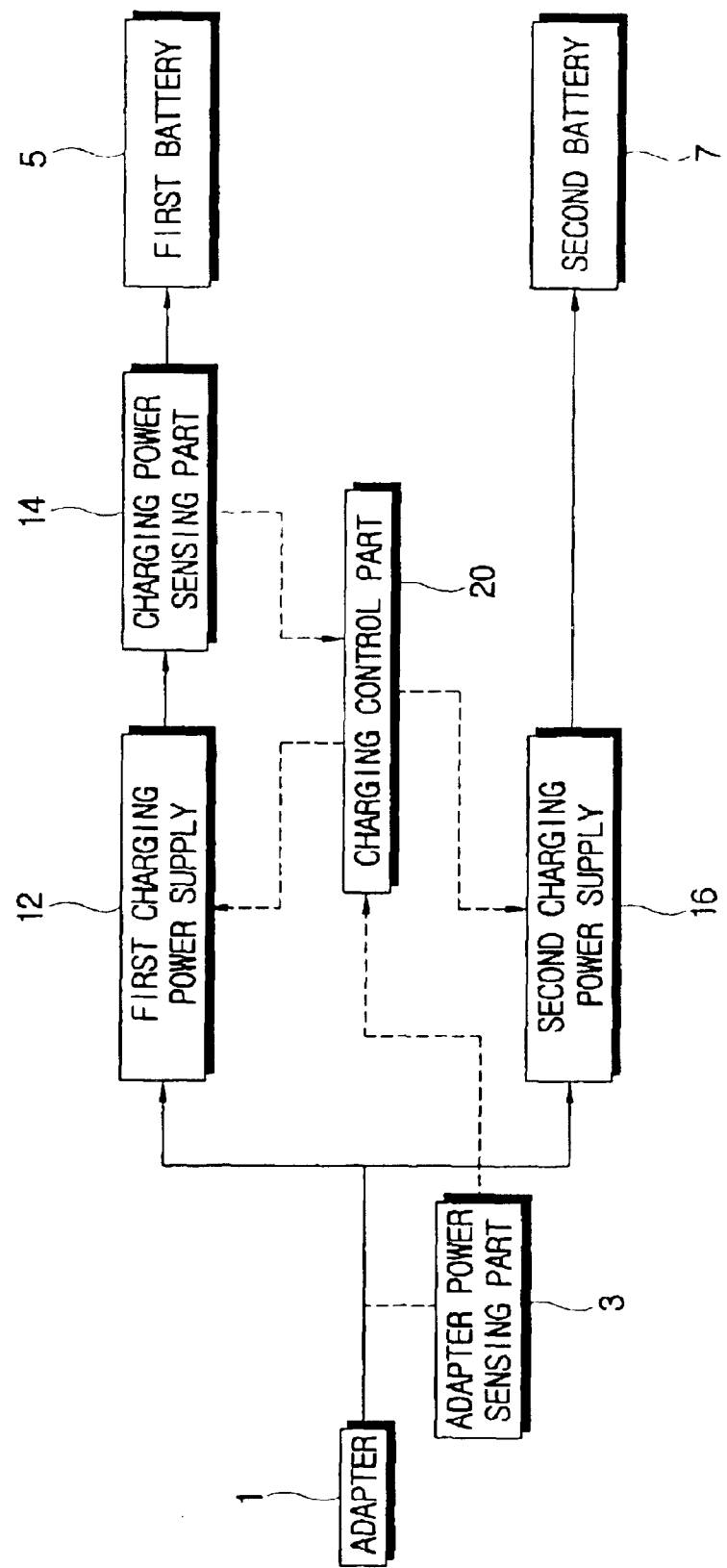
FIG. 1 is a control block diagram of a battery charging system according to an embodiment of the present invention.

Reference will now be made in detail to the embodiment of the present invention, examples of which are illustrated in the accompanying drawings, wherein like reference numerals refer to like elements throughout. The embodiment is described below in order to explain the present invention by referring to the figures.

FIG. 1 is a control block diagram of a battery charging system according to an embodiment of the present invention. As shown therein, the battery charging system includes an adapter 1 through which an external electric power is supplied, an adapter power sensing part 3 sensing whether the external electric power is supplied through the adapter 1, and first and second charging power supplies 12 and 16 supplying the electric power from the adapter 1 to first and second batteries 5 and 7 so as to charge the first and second batteries 5 and 7. Further, the battery charging system includes a charging power sensing part 14 sensing a voltage and a current supplied to the first battery 5, and a charging control part 20 controlling the first and second charging power supplies 12 and 16 to supply a charging power to the first and second batteries 5 and 7 when the adapter power sensing part 3 senses that the external electric power is supplied.

The adapter 1 converts an external AC (alternating current) power into a DC (direct current) power and supplies the DC power to the first and second charging power supplies 12 and 16. The first and second charging power supplies 12 and 16 convert the DC power from the adapter 1 into the charging power suitable for charging the first and second batteries 5 and 7 according to a control of the charging control part 20, thereby charging the first and second batteries 5 and 7 with the charging power.

The first and second charging power supplies 12 and 16 supply a constant current for charging the first and second batteries 5 and 7 in an early charging stage, which is called a constant-current charging mode, and supply a constant voltage for charging the first and second batteries 5 and 7 after an elapse of a predetermined period of time from the constant-current charging mode, which is called a constant-voltage charging mode.

The charging power sensing part 14 senses the voltage and/or the current supplied to the first battery 5 and transmits the sensed voltage and/or current value to the charging control part 20.

The charging control part 20 first controls the first charging power supply 12 to charge the first battery 5 with the charging power when the adapter power sensing part 3 senses that the external electric power is supplied.

While the first battery 5 is charged, the charging control part 20 determines a charging mode by sensing the voltage and/or current supplied from the first charging power supply 12 to the first battery 5 by the charging power sensing part 14.

When it is determined that the charging mode for the first battery 5 is changed from the constant-current charging mode into the constant-voltage charging mode, the charging control part 20 controls the second charging power supply 16 to begin to charge the second battery 7, so that the charging power not being supplied to the first battery 5 is provided for the second battery 7.

Thus, when the first battery 5 is almost charged, the second battery 7 starts to be charged, i.e., the first and second batteries 5 and 7 are simultaneously charged, so that time taken to charge both the first and second batteries 5 and 7 is reduced by starting to charge the second battery 7 in advance before the charging of the first battery is finished.

With this configuration of the battery charging system according to the present invention, a process of charging two or more batteries will be described with reference to FIGS. 1 to 3.

Figure 2:
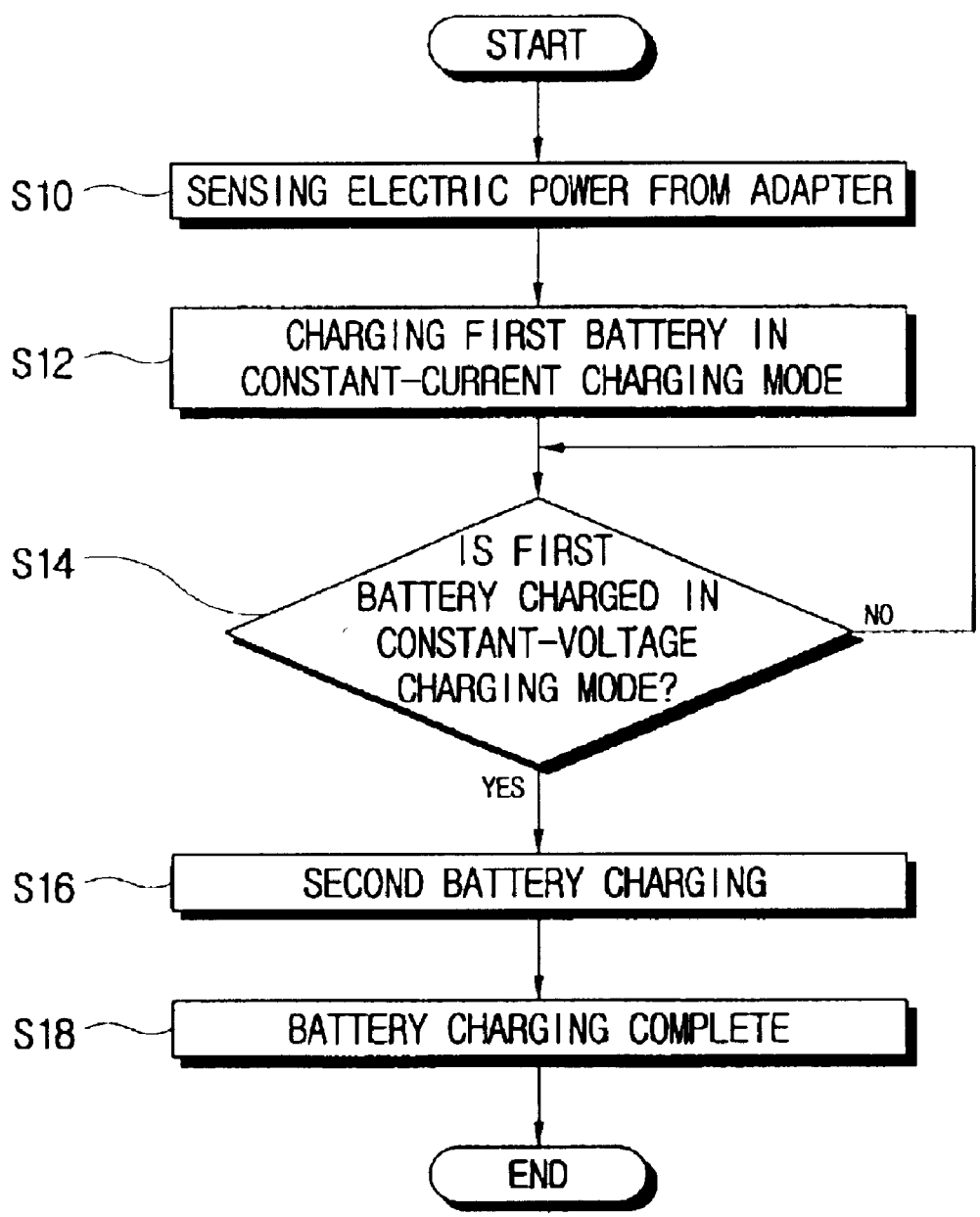
FIG. 2 is a flowchart of a battery charging method in the battery charging system shown in FIG. 1.
Figure 3:
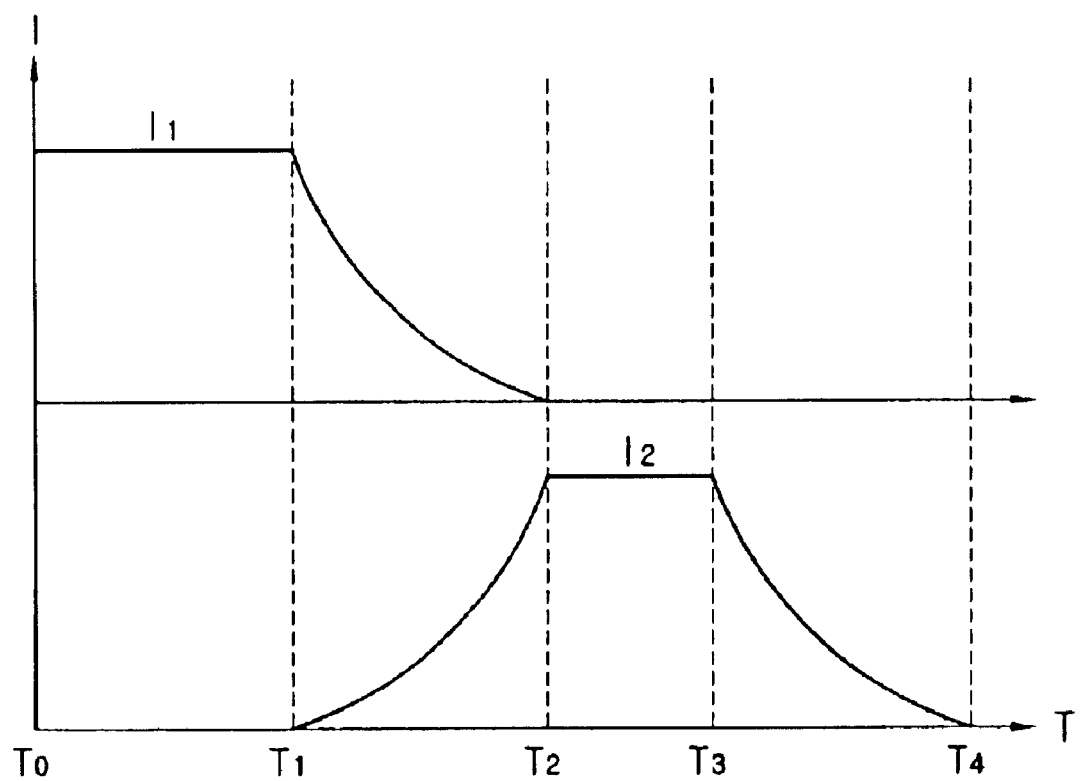
FIG. 3 is a graph illustrating a current variation when two batteries are charged according to the flowchart of FIG. 2.
Figure 4:
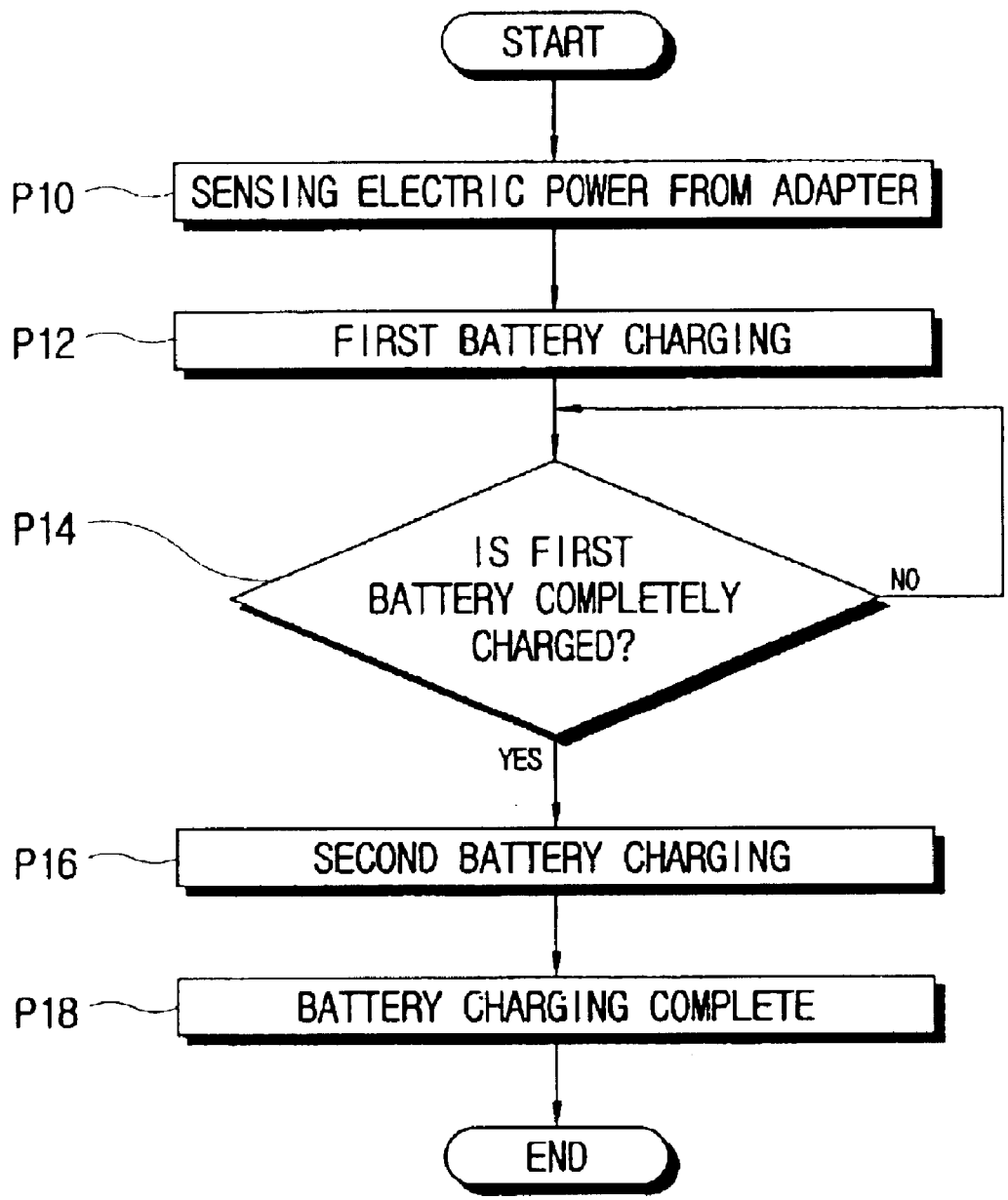
FIG. 4 is a flowchart of a conventional battery charging method when two batteries for a notebook computer are charged.
Figure 5:
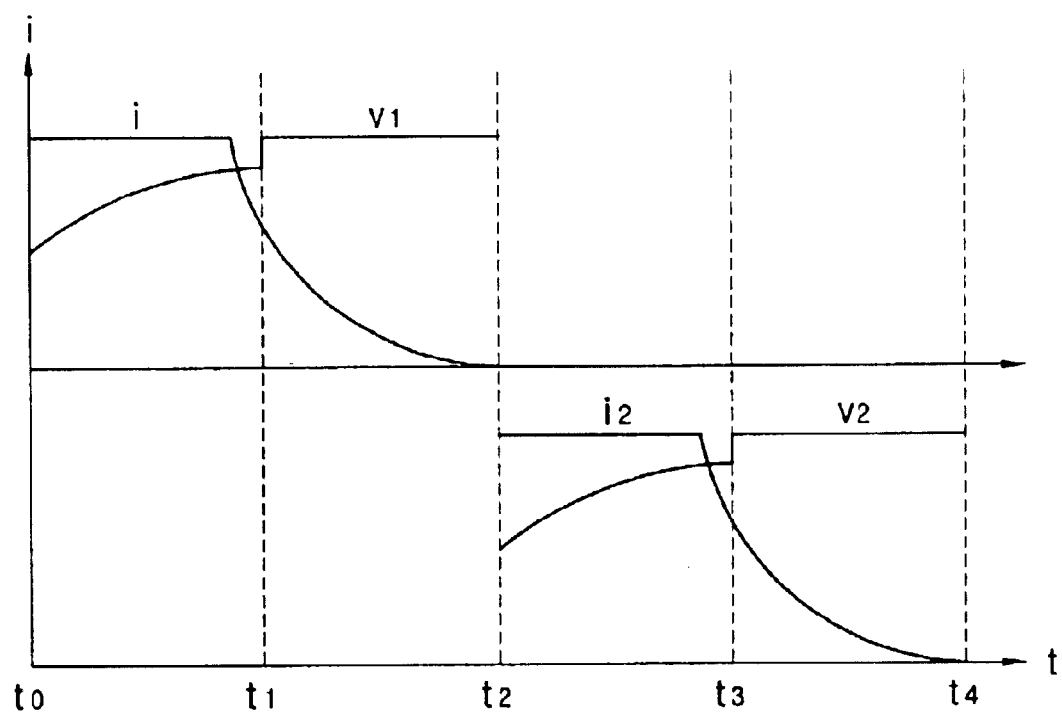
FIG. 5 is a graph illustrating voltage and current variations when two batteries are charged according to the flowchart of FIG. 4.

FIG. 2 is a flowchart of a battery charging method in the battery charging system shown in FIG. 1, and FIG. 3 is a graph illustrating a current variation when two batteries are charged according to the flowchart of FIG. 2.

As shown therein, in a case where the first and second batteries 5 and 7 are both charged, when the adapter power sensing part 3 senses that the external electric power is supplied through the adapter 1 in operation S10, the charging control part 20 first controls the first charging power supply 12 to begin to charge the first battery 5 in operation S12. At this time, the charging mode is of the constant-current charging mode. In other words, when the first battery 5 starts to be charged, a constant charging current ($I_1$) is supplied from the first charging power supply 12 to the first battery 5 (see an interval between $T_0$ and $T_1$). After an elapse of a predetermined period of time from the constant-current charging mode, the first charging power supply 12 charges the first battery 5 with a constant voltage of the charging power. At this time, the current ($I_1$) supplied to the first battery 5 is gradually decreased (see an interval between $T_1$ and $T_2$).

Then, on a basis of the current and/or voltage of the charging power sensed by the charging power sensing part 14, the charging control part 20 determines whether or not the first battery 5 is charged in the constant-voltage charging mode ($T_1 \sim T_2$) in operation S14. Herein, the charging power sensing part 14 senses at least one of the voltage and the current of the charging power supplied from the first charging power supply 12 to the first battery 5, and transmits the sensed voltage and/or current value to the charging control part 20.

In a case that the charging power sensing part 14 senses the voltage, the charging control part 20 determines the charging mode for the first battery 5 as the constant-voltage charging mode ($T_1$~$T_2$) when the voltage supplied to the first battery 5 is kept constant.

Oppositely, in the case that the charging power sensing part 14 senses the current, the charging control part 20 determines that the charging mode for the first battery 5 is the constant-voltage charging mode ($T_1$~$T_2$) when a current supplied to the first battery 5 is gradually decreased.

When it is determined that the charging mode for the first battery 5 is changed into the constant-voltage charging mode ($T_1$~$T_2$), the charging control part 20 controls the second charging power supply 16 to supply the charging power to the second battery 7 in operation S16. In an interval ($T_1$~$T_2$) during which the first and second batteries 5 and 7 are simultaneously charged, the charging power for the second battery 7 is an idle power created during charging the first battery 5, so that a current ($I_2$) supplied to the second battery 7 is gradually increased as much as the current ($I_1$) is decreased.

When the first battery 5 is completely charged, the second charging power supply 16 keeps the current ($I_2$) of the charging power supplied to the second battery 7 constant, that is, the charging mode for the second battery 7 is changed into the constant-current charging mode (see an interval between $T_2$ and $T_3$). After an elapse of a predetermined period of time from the constant-current charging mode, the second charging power supply 16 changes the constant-current charging mode into the constant-voltage charging mode to charge the second battery 7 with the constant voltage. At this time, the current ($I_2$) supplied to the second battery 7 is gradually decreased (see an interval between $T_3$ and $T_4$).

When the second battery 7 is completely charged, charging both of the first and second batteries 5 and 7 is completed in operation S18.

In the foregoing embodiment, the present invention is applied to charging two batteries. However, the present invention may be applied to charging two or more batteries.

As described above, a voltage and/or a current of a charging power for a battery to be first charged are sensed, and then a charging mode for the battery being charged is determined, thereby determining whether the battery is almost charged. When it is determined the battery is almost charged, an idle power is employed for charging another battery, thereby not only reducing the time of charging two or more batteries by advancing a start in charging another battery but also efficiently using an electrical power of a power source when two or more batteries are charged.

As described above, the present invention provides a battery charging system and a charging method thereof, which can not only reduce the time of charging two or more batteries but also efficiently use the electrical power of the power source when two or more batteries are charged.

Although an embodiment of the present invention have been shown and described, it will be appreciated by those skilled in the art that changes may be made in this embodiment without departing from the principles and spirit of the invention, the scope of which is defined in the appended claims and their equivalents.

What is claimed is:
1. A battery charging system comprising:
two or more rechargeable batteries;
a charging power supply charging the batteries with an external electric power;
a charging power sensing part sensing at least one of a voltage and a current of a charging power supplied from the charging power supply to the batteries; and
a charging control part controlling the charging power supply to supply an idle power created during charging one of the batteries, to another one of the batteries according to a sensed result of the charging power sensing part.

2. The battery charging system according to claim 1, wherein the charging control part determines that the idle power is created when the voltage supplied to the one of the batteries is kept constant according to the sensed result of the charging power sensing part, and then controls the charging power supply to supply the idle power to the another one of the batteries.

3. The battery charging system according to claim 1, wherein the charging control part determines that the idle power is created when the current supplied to the one of the batteries is gradually decreased according to the sensed result of the charging power sensing part, and then controls the charging power supply to supply the idle power to the another one of the batteries.

4. A battery charging system comprising:
first and second rechargeable batteries;
a charging power supply charging the batteries with a charging power;
a charging power sensing part sensing at least one of a voltage and a current of the charging power supplied from the charging power supply to the first battery; and
a charging control part controlling the charging power supply to supply an idle power to the second battery upon determining that the first battery is charged in a constant-voltage charging mode, in which the voltage supplied to the first battery is kept constant, according to a sensed result of the charging power sensing part.

5. A battery charging method of charging two or more rechargeable batteries, and a charging power supply charging the batteries with an external electric power, the method comprising:
charging one of the batteries when the external electric power is supplied;
sensing at least one of a voltage and a current of a charging power supplied to the one battery being charged;
determining whether an idle power is created during charging the one of the batteries according to a sensed result of the charging power; and
controlling the charging power supply to supply the idle power to another one of the batteries upon determining that the idle power is created.

6. The battery charging method according to claim 5, wherein the determining of whether the idle power is created comprises:
determining whether the voltage of the charging power supplied to the one of the batteries is kept constant.

7. The battery charging method according to claim 5, wherein the determining of whether the idle power is created comprises:
determining whether the current of the charging power supplied to the one of the batteries is gradually decreased.

8. A battery charging method of charging two or more rechargeable batteries using a charging power supply charging the batteries with an external electric power, the method comprising:
   charging one of the batteries when the external electric power is supplied;
   sensing at least one of a voltage and a current of a charging power supplied to the one of the batteries being charged;
   determining that the one of the batteries is charged in a constant-voltage charging mode when the voltage of the charging power supplied to the one of the batteries is kept constant; and
   controlling the charging power supply to supply an idle power to another one of the batteries upon determining that the one of the batteries is charged in the constant-voltage charging mode.

9. A battery charging system comprising:
   first and second batteries;
   a charging power supply charging the first and second batteries with a charging power; and
   a charging control part controlling the charging power supply to charge the first battery in a constant-current mode and simultaneously charge the first battery in a constant-voltage charging mode and the second battery using an idle power created during charging the first battery.

10. The battery charging system according to claim 9, further comprising:
   a charging power sensing part sensing one of a voltage and a current of the charging power supplied from the charging power supply to the first battery, wherein the charging control part controls the charging power supply to charge the first battery and the second battery according to the sensed one of the voltage and the current of the charging power.

11. The battery charging system according to claim 10, wherein the charging control part controls the charging power supply to change from the constant-current charging mode to the constant-voltage charging mode according to the sensed one of the voltage and the current.

12. The battery charging system according to claim 10, wherein the charging control part controls the charging power supply to charge the second battery with the idle power according to the sensed one of the voltage and the current while the charging power supply charges the first battery in the constant-voltage charging mode.

13. The battery charging system according to claim 10, wherein the charging control part controls the charging power supply to charge the second battery in the constant-current charging mode according to the sensed one of the voltage and the current.

14. The battery charging system according to claim 10, wherein the charging control part controls the charging power supply to charge the second battery in the constant-current charging mode according to the sensed one of the voltage and the current when the charging power supply stops charging the first battery in the constant-voltage charging mode.

15. The battery charging system according to claim 9, wherein the charging control part controls the charging power supply to charge the second battery with an idle power created during charging the first battery in the constant-voltage charging mode after the first battery has been charged in the constant-current charging mode.

16. The battery charging system according to claim 9, wherein the idle power is created from the charging power when the constant-current charging mode is changed to the constant-voltage charging mode to charge the first battery.

17. The battery charging system according to claim 9, wherein the charging power comprises a charging current, which is required to charge the first battery in the constant-voltage charging mode, and the charging power supply charges the second battery with the idle power while charging the first battery with the charging current in the constant-voltage charging mode.

18. A battery charging method of charging first and second batteries, the method comprising:
   charging the first battery in a constant-current charging mode; and
   simultaneously charging the first battery in a constant-voltage charging mode and the second battery using an idle power created when the first battery is charged in the constant-voltage charging mode so that a current supplied to the second battery is gradually increased.

19. The battery charging method according to claim 18, wherein the simultaneously charging of the first and second batteries comprises:
   charging the second battery in the constant-current charging mode when the constant-voltage charging mode is terminated in the first battery.

* * * * *